US008274786B2

(12) United States Patent
Sapper et al.

(10) Patent No.: US 8,274,786 B2
(45) Date of Patent: Sep. 25, 2012

(54) FLIPPABLE I/O PORT FOR PORTABLE COMPUTER

(75) Inventors: Richard Sapper, Milan (IT); Peter Geoffrey Gaucher, Cary, NC (US); Howard Jeffrey Locker, Cary, NC (US); Michael Terrell Vanover, Raleigh, NC (US); Shigeki Mori, Yamato (JP); Tomoyuki Takahashi, Fujisawa (JP); Hidenori Kinoshita, Tokyo (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 320 days.

(21) Appl. No.: 12/605,005

(22) Filed: Oct. 23, 2009

(65) Prior Publication Data

US 2011/0096483 A1    Apr. 28, 2011

(51) Int. Cl.
*H05K 5/00* (2006.01)
(52) U.S. Cl. ............... 361/679.4; 361/679.02; 361/727; 361/752; 361/790; 361/797; 439/31; 439/32; 439/131; 439/638; 439/640
(58) Field of Classification Search ............ 361/679.02, 361/727, 752, 790, 797, 679.4; 439/31, 32, 439/131, 638, 640
See application file for complete search history.

(56) References Cited

U.S. PATENT DOCUMENTS

| 6,273,735 | B1 * | 8/2001 | Johnson et al. ............... 439/131 |
| 7,410,371 | B2 * | 8/2008 | Shabtai et al. ................ 439/131 |
| 7,486,279 | B2 * | 2/2009 | Wong et al. ................... 345/173 |
| 7,991,433 | B2 * | 8/2011 | Mellage et al. ............... 455/557 |
| 2004/0109722 | A1 * | 6/2004 | Huang ............................ 403/57 |
| 2005/0282417 | A1 * | 12/2005 | Tsao ............................. 439/131 |
| 2008/0125970 | A1 * | 5/2008 | Scheckler ..................... 701/213 |
| 2009/0251372 | A1 * | 10/2009 | Degner et al. ................ 343/702 |
| 2009/0323269 | A1 * | 12/2009 | Iwata ....................... 361/679.09 |

OTHER PUBLICATIONS

TheFlip.com specifications, http:www.theflip.com/en-us/products/specs.aspx.
Imation, "Clip Flash Drive", http://www.imation.com/en/imation-Products/USB-Flash-Drives-Accessories/Clip-Flash-Drive/.

* cited by examiner

*Primary Examiner* — Jinhee Lee
*Assistant Examiner* — James Wu
(74) *Attorney, Agent, or Firm* — John L. Rogitz; John M. Rogitz

(57) ABSTRACT

An I/O housing holds an I/O port and is pivotable between a housed position, wherein the I/O housing is held snugly flat in a chassis of the computer, and an extended position, wherein the port end of the housing is distanced from the chassis. The I/O housing can mechanically engage an I/O device with the port establishing communication between the I/O device and the computer processor.

13 Claims, 3 Drawing Sheets

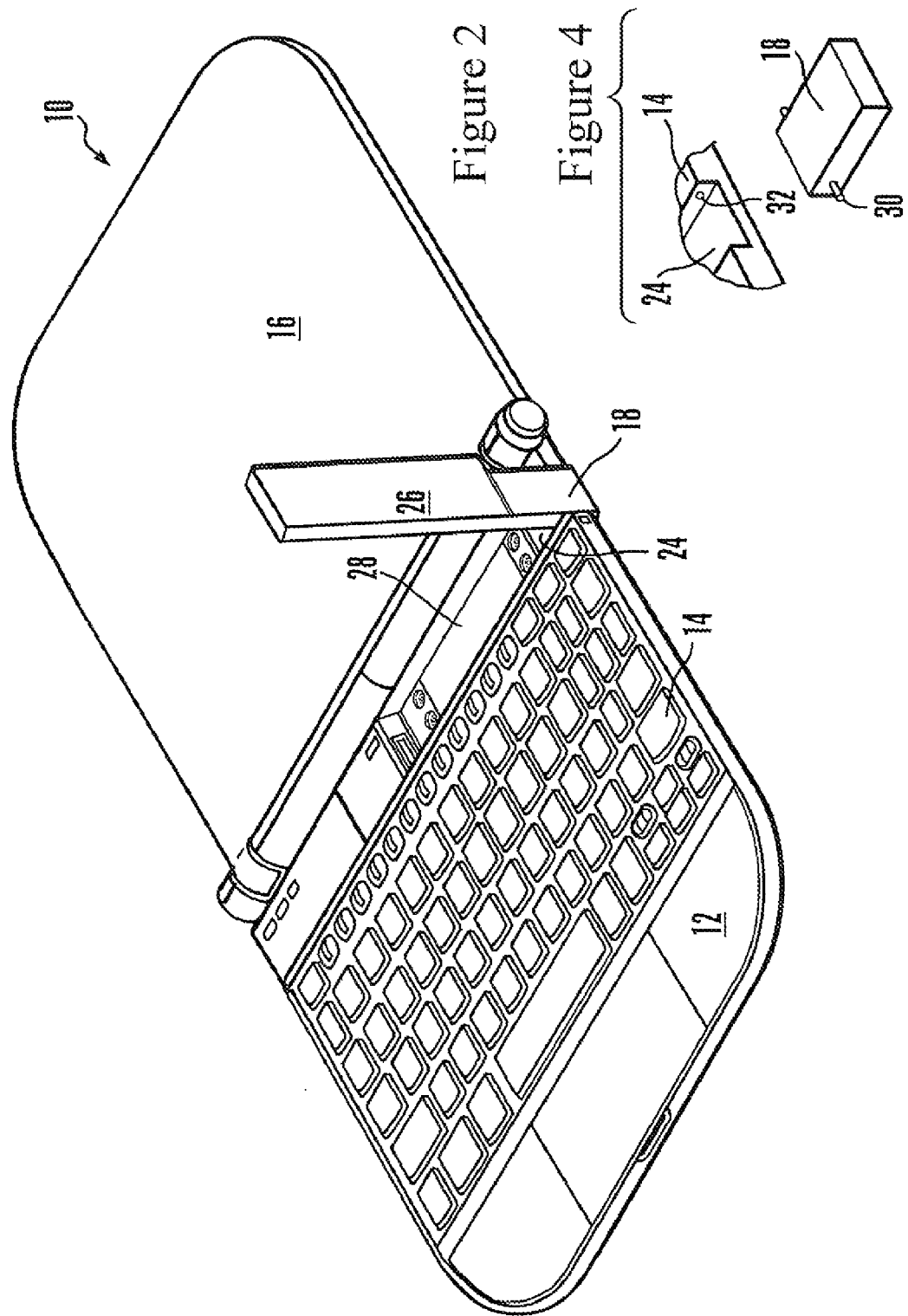

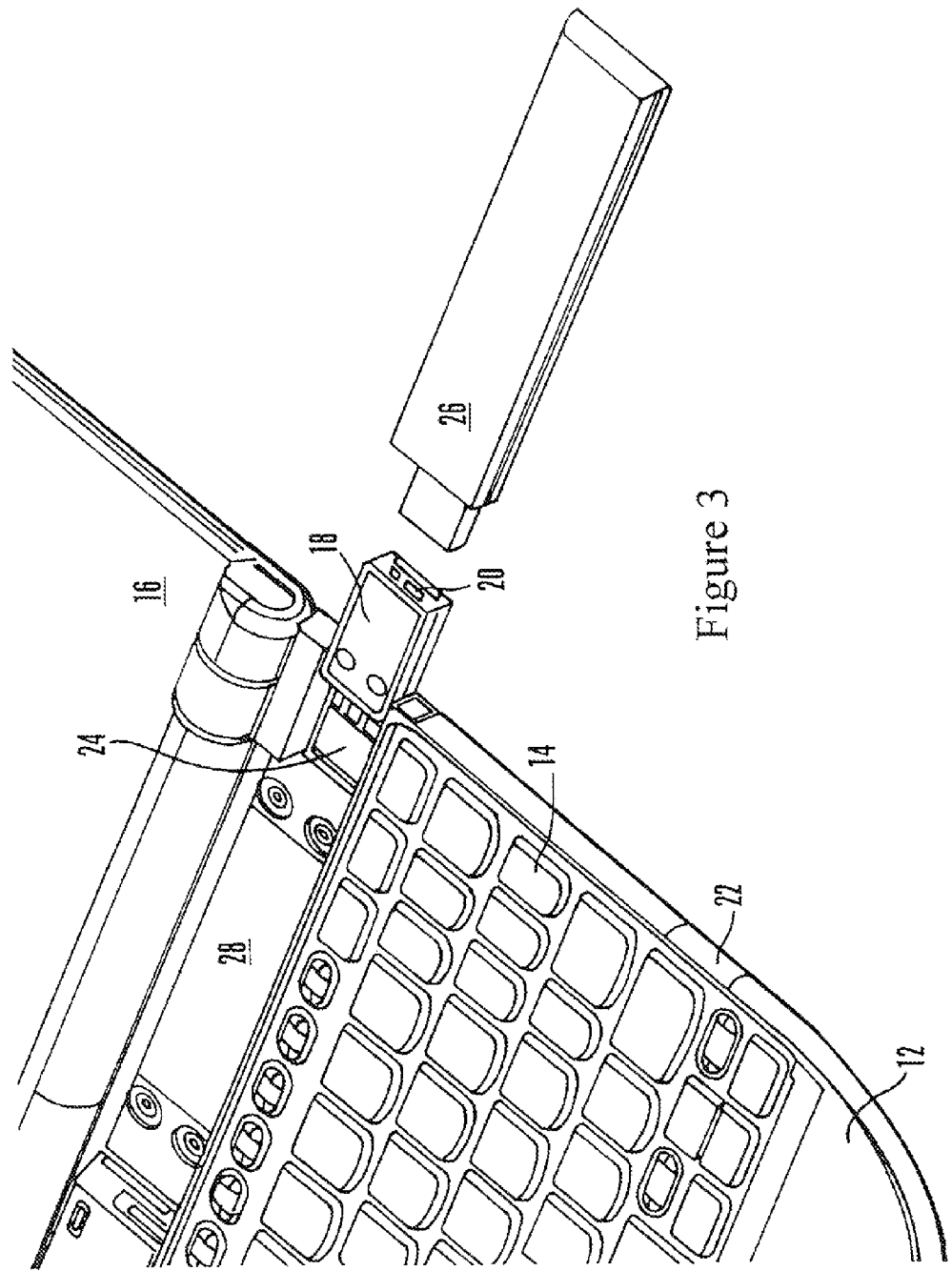

FLIPPABLE I/O PORT FOR PORTABLE COMPUTER

FIELD OF THE INVENTION

The present invention relates generally to I/O ports for portable computers such as laptop computers.

BACKGROUND OF THE INVENTION

Computers such as laptop computers typically have ports for accepting connections to universal serial bus (USB) peripheral components such as memory sticks, audio headsets, and a host of such USB devices. As understood herein, the ports can be exposed to dirt and debris when uncovered. Also, as understood herein the USB peripherals, which are typically separate from the computer, require separate carrying accommodations and can become easily lost.

SUMMARY OF THE INVENTION

Accordingly, an apparatus has a chassis defining a keyboard support and a display. A processor in the chassis receives signals from keys on the keyboard support and provides output to the display. An input/output (I/O) port housing is movably mounted on the chassis, and the housing holds an input/output (I/O) port that is operatively engaged to the processor. The housing is movable between a housed position, in which the housing is disposed in a housing bay established by the keyboard support of the chassis, and an extended position, in which the housing is pivoted relative to the housed position and in which the port faces away from the chassis. Furthermore, the housing is removably engageable with an I/O device. The housing bay is configured to snugly hold the housing, and a device bay is formed by the chassis and is contiguous to the housing bay. The device bay is configured to hold the I/O device when the housing is in the housed position. When the housing is in the housed configuration, an exposed surface of the housing is substantially flush with an exposed surface of the keyboard support.

In example embodiments, when the I/O device is engaged with the housing in the housed position, an exposed surface of the I/O device is substantially flush with the exposed surface of the keyboard support. In the extended position the housing is pivoted away from the housed position to orient the free end of the housing at a predetermined position, and in one example implementation the housing in the extended position may be oriented about 180° relative to the housed position. The port may be a USB port and the I/O device may be a USB device.

If desired, when the I/O device is engaged with the housing the I/O device is always operatively engaged to the processor regardless of the position of the housing. Alternatively, when the housing is in the housed position the I/O device, if mechanically engaged with the housing, is operatively unengaged from the processor. An elongated pivot pin can extend through the housing into opposed cavities formed in the chassis. The pivot pin affords pivotable motion of the housing about the pivot pin relative to the chassis.

In another aspect, a computer has a display, a computer chassis holding a computer processor, with the computer chassis defining I/O port bay of sufficient size to allow for containment of an I/O device, and an I/O port housing pivotably attached to the computer chassis and adjacent to a side of the computer chassis. The I/O port housing includes a I/O port operatively engaged to the processor. The I/O port housing pivots between a first position in which the I/O port can be connected to an I/O device contained within the I/O port bay while the display is in a closed position, and a second position facing away from the computer chassis in which the I/O port can be connected to the I/O device external to the computer chassis.

In another aspect, a computer includes a chassis holding a processor and an I/O housing holding an I/O port. The I/O housing is pivotable between a housed position, wherein the I/O housing is held snugly flat in the chassis, and an extended position, wherein a port end of the housing is distanced from the chassis. The I/O housing is mechanically engageable with an I/O device with the port establishing communication between the I/O device and the processor.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a perspective view of a portable computer showing the flippable USB port housing in between the housed position and the fully extended position, connected to a USB device;

FIG. 3 is a perspective view of a portable computer showing the flippable USB port housing in the fully extended position, showing the USB device in an exploded relationship with the housing and with portions of the computer omitted for clarity, showing the computer processor schematically; and FIG. 4 is a perspective view showing the USB port housing in an exploded relationship with the USB port bay to illustrate the pivot pin, with portions of the computer omitted for clarity.

DETAILED DESCRIPTION OF THE PREFERRED EMBODIMENTS

Figure 1:
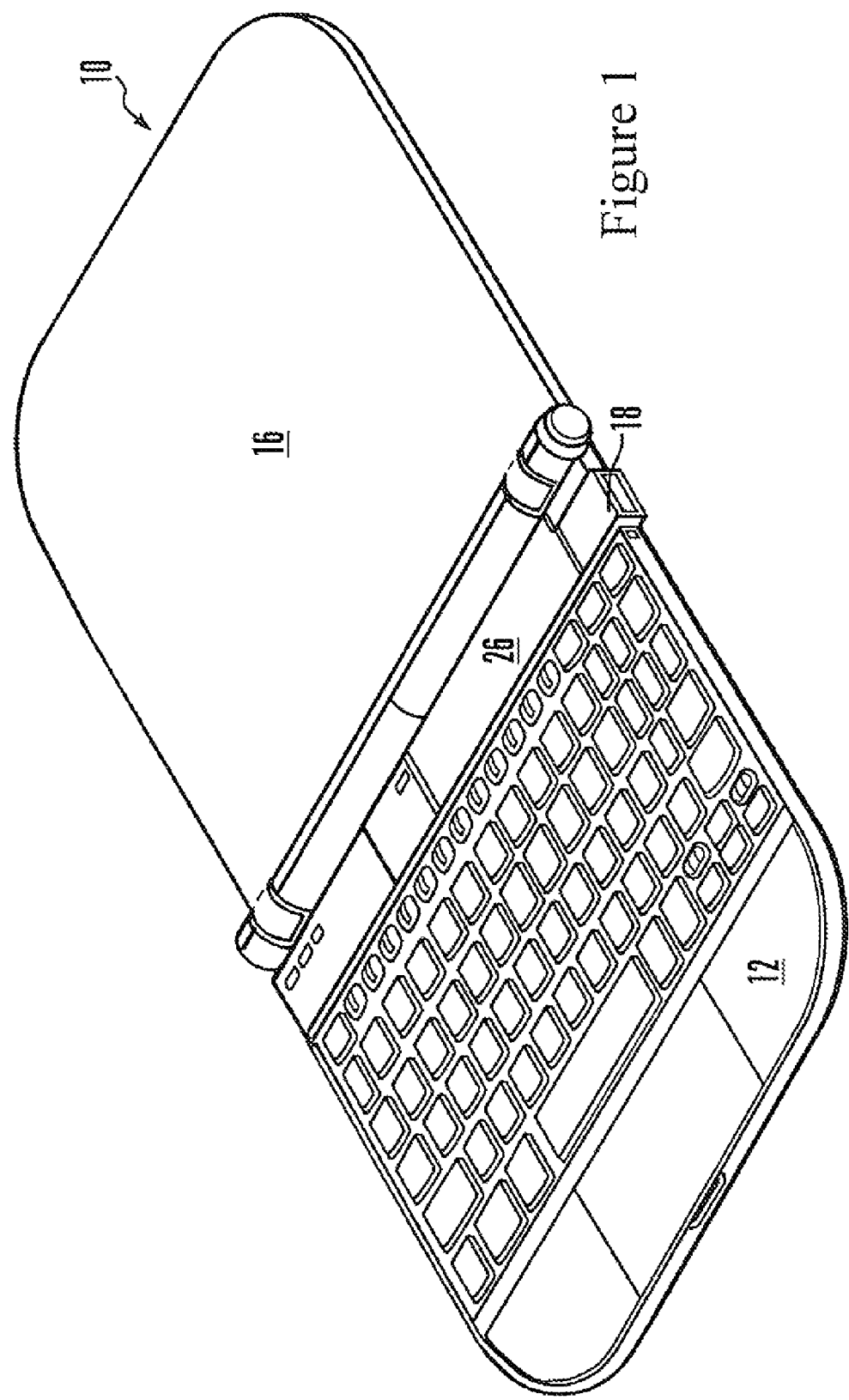
FIG. 1 is a perspective view of a portable computer showing the flippable USB port housing in the housed position, connected to a USB device that is disposed in the USB port bay.

Referring initially to FIG. 1, a computer 10 is shown, preferably a portable computer such as a laptop, notebook, or personal digital assistant (PDA), or smart phone, or mobile Internet device. The computer 10 may be a desktop computer. In any case, the computer 10 is formed with having a chassis 12.

As shown, the chassis 12 holds a support 14. In the example non-limiting embodiment shown, the support 14 is a keyboard or keypad support 14 that bears keys which can be manipulated by a person to input signals to the processor disclosed below. In other embodiments, the computer may not have a keyboard or keypad but instead may be, e.g., a slate computer, in which case the support 14 would hold input keys. In some example embodiments a computer display 16 is hingedly connected to the key board support 14 between an open configuration as shown in FIG. 1, in which the display 16 is distanced from the support 14 and consequently can be seen by a user of the computer 10, and a closed configuration, in which the display 16 is substantially flush against the support 14 and thus is not exposed to view.

Now cross-referencing FIGS. 1-3, a housing 18 is movable on the chassis 12 and as best shown in FIG. 3, the housing 18 holds an input/output (I/O) port 20 which is essentially an electrical connector that is electrically connected to a computer processor 22 within the chassis 12. In one implementation, the processor 22 may be, without limitation, an ARM processor or an Intel processor (or other processors common to the industry). The processor 22 typically is connected to a processor bus and a cache, as well as storage. In any case, the I/O port 20 may be a universal serial bus (USB) port, in which case the housing 18 establishes a USB port housing.

In cross-reference to FIGS. 1-3, the housing 18 is movable between a housed position (FIG. 1), in which the housing 18 is disposed in a bay 24 established by the support 14 of the chassis 12, and an extended position (FIG. 3), in which the housing 18 is pivoted to be oriented about 180° relative to the housed position and is extended beyond the chassis 12 as shown in FIG. 3. While pivoting the housing 18 passes through an intermediate configuration (FIG. 2) in which the housing 18 is perpendicular to the keyboard support 14. Thus, the range of motion of the housing may be between zero and 180 degrees and while the extended position shown is at 180 degrees the extended position itself may result in a different orientation, e.g., between 90 degrees and 180 degrees. In the extended position in the example non-limiting implementation shown the port 20 faces away from the chassis 12 as shown in FIG. 3. The housing need not pivot through an entire 180 degrees, however.

Regardless of its position, the example housing 18 can be removably engaged with an I/O device 26 such as a USB device such as but not limited to a portable removable memory module, an audio headphone jack, or any other USB device. To this end, FIG. 3 best shows that the bay 24, which is configured to snugly hold the housing 18 in a light interference fit, is contiguous to a device bay 28 formed by the chassis 12. The device bay 28 is configured to hold the USB device 26 when the housing 18 is in the housed position and consequently which may be wider than the housing bay 24 as shown. Together the housing bay 24 and device bay 28 establish a USB port bay. Note that the USB device 26 may fit snugly into the device bay 28 just as the housing 18 fits snugly into the housing bay 24. Note further that the USB device 26 can remain engaged with the housing 18 in both the housed and extended positions and, thus, can pivot with the housing 18. Or, the USB device 26 may be disconnected from the housing 18 and the housing 18 pivoted by itself, with the USB device then being connected to the housing 18.

As shown in FIG. 1, when the housing 18 is in the housed configuration, the exposed surface of the housing 18 is substantially flush with the exposed surface of the keyboard support 14. Likewise, when the USB device 26 is engaged with the housing 18 in the housed configuration, the exposed surface of the USB device 26 is substantially flush with the exposed surface of the keyboard support 14. The USB device 26 need not be engaged with the housing 18 in the housed configuration, however.

If desired, when the USB device 26 is engaged with the housing 18 it is always electrically connected to the processor 22 regardless of the position of the housing 18. In other embodiments, however, when the housing 18 is in the housed position the USB device 26 may be electrically disconnected from the processor 22 by, e.g., a switch or software logic even if the USB device 26 remains mechanically engaged with the housing 18.

FIG. 4 shows that in an example implementation an elongated pivot pin 30 may extend through the housing 18 and into opposed cavities 32 (only a single cavity 32 shown in the perspective of FIG. 4) that are formed in the chassis 12. The pivot pin is rotatably engaged with the cavities 32 or the pivot pin is rotatably engaged with the housing 18 but in either case affords pivotable motion of the housing 18 about the pivot pin 30 relative to the chassis 12. If desired a spring can be coupled to the pivoting structure to bias the housing 18 to the housed or extended position as desired. Other methods of rotatable coupling may be used.

While the particular FLIPPABLE USB PORT FOR PORTABLE COMPUTER is herein shown and described in detail, it is to be understood that the subject matter which is encompassed by the present invention is limited only by the claims.

What is claimed is:

1. Apparatus comprising:
a chassis defining a support and a display;
a processor in the chassis receiving signals from keys on the support and providing output to the display;
an input/output (I/O) port housing movably mounted on the chassis, the housing holding an I/O port, the port being operatively engaged with the processor, wherein
the housing is movable between a housed position, in which the housing is disposed in a housing bay established by the support of the chassis, and an extended position, in which the housing is pivoted relative to the housed position and in which the port faces away from the chassis, the housing being removably engageable with an I/O device, the housing bay being configured to snugly hold the housing, a device bay being formed by the chassis and being contiguous to the housing bay, the device bay being configured to hold the I/O device when the housing is in the housed position,
wherein when the housing is in the housed configuration, an exposed surface of the housing is substantially flush with an exposed surface of the support, wherein in the extended position the housing is oriented 180° relative to the housed position, wherein when the housing is in the housed position, the I/O device, if mechanically engaged with the housing, is operatively disengaged from the processor.

2. The apparatus of claim 1, wherein when the I/O device is engaged with the housing in the housed position, an exposed surface of the I/O device is substantially flush with the exposed surface of the support.

3. The apparatus of claim 1, wherein the port is a USB port and the I/O device is a USB device.

4. The apparatus of claim 1, comprising an elongated pivot pin extending through the housing into opposed cavities formed in the chassis, the pivot pin affording pivotable motion of the housing about the pivot pin relative to the chassis.

5. Information handling system comprising:
a display;
a chassis holding a processor, the chassis defining an I/O port bay of sufficient size to allow for containment of an externally provided I/O device;
an I/O port housing pivotably attached to the chassis and adjacent to a side of the chassis, the I/O port housing including an I/O port operatively engaged with the processor;
wherein the I/O port housing pivots between a first position in which the I/O port can be connected to an externally provided I/O device to be contained within the I/O port bay while the display is in a closed position, and a second position facing away from the chassis in which the I/O port can be connected to an externally provided I/O device external to the chassis; wherein
the housing is movable between a housed position, in which the housing is disposed in the port bay established by the chassis, and the second position which is an extended position, in which the housing is oriented 180° relative to the housed position and is extended beyond the chassis, and further wherein the first position is established while pivoting the housing through an intermediate configuration in which the housing is perpendicular to the housed position, wherein when the housing is in the first position, the I/O device, if mechanically engaged with the housing, is electrically disconnected from the processor.

6. The system of claim 5, wherein when the I/O device is engaged with the housing in the first position, an exposed surface of the I/O device when engaged with the housing is substantially flush with the exposed surface of a support.

7. The system of claim 5, comprising an elongated pivot pin extending through the housing into opposed cavities formed in the chassis, the pivot pin affording pivotable motion of the housing about the pivot pin relative to the chassis.

8. The system of claim 5, wherein the I/O port bay establishes a device bay and a contiguous housing bay, the device bay being configured to hold the I/O device when the housing is in the first position and the housing bay being configured to hold the housing.

9. Information handling system comprising:
chassis holding a processor;
an I/O housing holding an I/O port and being pivotable between a housed position, wherein the I/O housing is held flat in the chassis, and an extended position, wherein a port end of the housing is distanced from the chassis, the I/O housing being mechanically engageable with an I/O device with the port establishing communication between the I/O device and the processor;
wherein when the housing is in the housed position, the I/O device, if mechanically engaged with the housing is, is operatively disengaged from the processor, wherein in the extended position the housing is oriented 180° relative to the housed position.

10. The system of claim 9, wherein when the I/O device is engaged with the housing in the housed position, an exposed surface of the I/O device is substantially flush with the exposed surface of a support of the chassis.

11. The system of claim 9, comprising an elongated pivot pin extending through the housing into opposed cavities formed in the chassis, the pivot pin affording pivotable motion of the housing about the pivot pin relative to the chassis.

12. The apparatus of claim 1, comprising an elongated pivot pin extending through the housing into opposed cavities formed in the chassis, the pivot pin affording pivotable motion of the housing about the pivot pin relative to the chassis.

13. The apparatus of claim 1, wherein the device bay is wider than the housing bay and both bays snugly receive their respective housing and device.

* * * * *